(12) United States Patent  
Iwamori et al.

(10) Patent No.: US 7,106,921 B2  
(45) Date of Patent: Sep. 12, 2006

(54) OPTICAL WAVEGUIDE INTERCONNECTION BOARD, METHOD OF MANUFACTURING THE SAME, PRECURSOR FOR USE IN MANUFACTURING OPTICAL WAVEGUIDE INTERCONNECTION BOARD, AND PHOTOELECTRIC MULTIFUNCTION BOARD

(75) Inventors: Toshimichi Iwamori, Ebina (JP); Takayuki Takeuchi, Ashigarakami-gun (JP); Toshihisa Hamano, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 38 days.

(21) Appl. No.: 10/957,734

(22) Filed: Oct. 5, 2004

(65) Prior Publication Data

US 2005/0213872 A1    Sep. 29, 2005

(30) Foreign Application Priority Data

Mar. 24, 2004   (JP)   ............................. 2004-087918

(51) Int. Cl.  
*G02B 6/12* (2006.01)

(52) U.S. Cl. ............................. 385/14; 385/15; 385/20; 385/129

(58) Field of Classification Search ................... 385/14, 385/15, 24, 49, 50, 88, 89, 129  
See application file for complete search history.

(56) References Cited

U.S. PATENT DOCUMENTS 4,708,423 A * 11/1987 Erman et al. .................. 385/14

FOREIGN PATENT DOCUMENTS

| JP | A-2003-057468 | 2/2003 |
| JP | A-2003-114365 | 4/2003 |
| JP | A-2003-131081 | 5/2003 |

* cited by examiner

*Primary Examiner*—Phan Palmer  
(74) *Attorney, Agent, or Firm*—Oliff & Berridge, PLC

(57) ABSTRACT

The present invention provides an optical waveguide interconnection board, including: optical input and output ports; at least one optical waveguide corresponding to an optical circuit pattern; and at least one light direction-changing element each of which is disposed between one of the optical input port and the optical output port and one of the at least one optical waveguide or, when the optical waveguide interconnection board has two or more optical waveguides, between two of the optical waveguides, and which comprises at least one of at least one light direction-changing element A that changes the direction of light in a plane parallel to a plane of the optical waveguide interconnection board and at least one light direction-changing element B that changes the direction of light to a direction having an angle with respect to a plane parallel to the plane of the optical waveguide interconnection board.

26 Claims, 13 Drawing Sheets

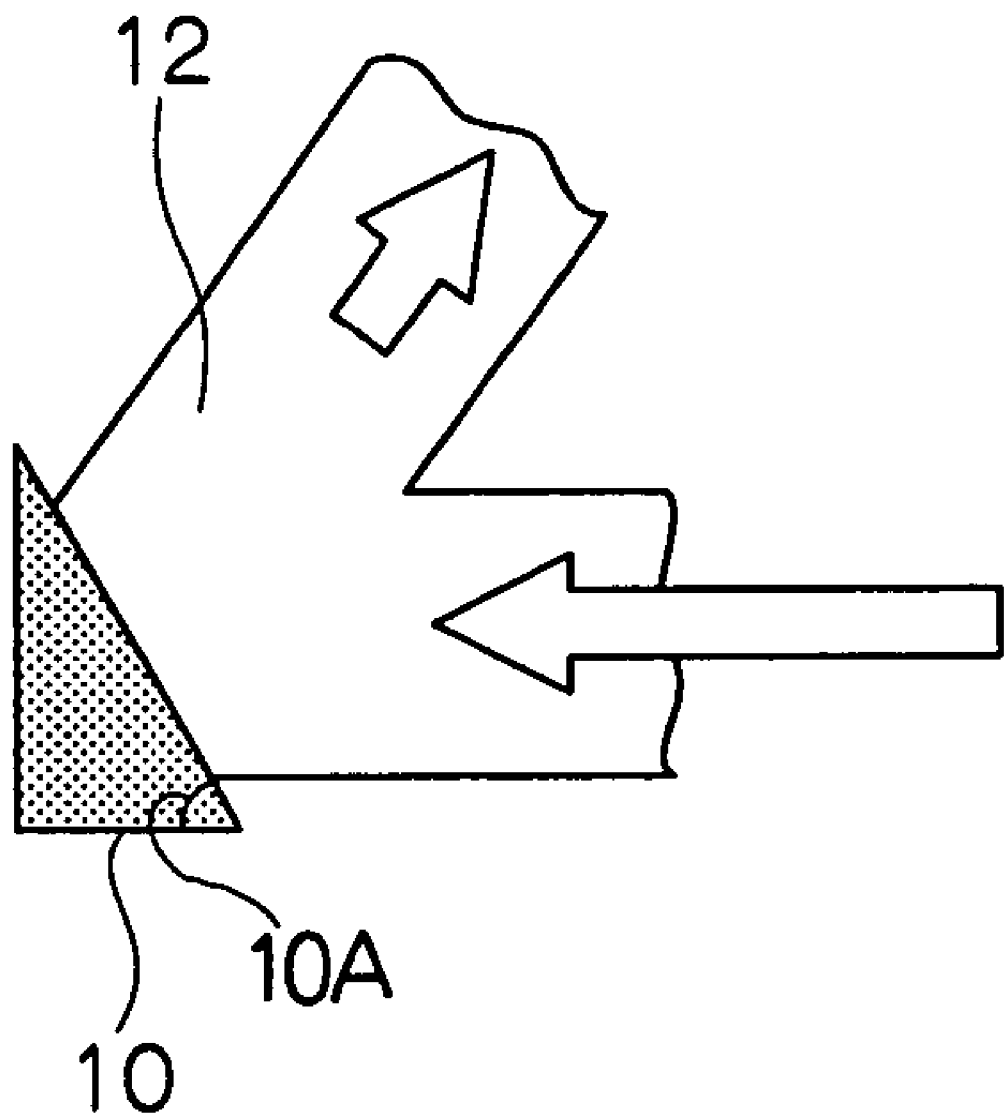

OPTICAL WAVEGUIDE INTERCONNECTION BOARD, METHOD OF MANUFACTURING THE SAME, PRECURSOR FOR USE IN MANUFACTURING OPTICAL WAVEGUIDE INTERCONNECTION BOARD, AND PHOTOELECTRIC MULTIFUNCTION BOARD

CROSS-REFERENCE TO RELATED APPLICATION

This application claims priority under 35 USC 119 from Japanese Patent Application No. 2004-87918, the disclosure of which is incorporated by reference herein.

BACKGROUND OF THE INVENTION

1. Field of the Invention

The present invention relates to an optical waveguide interconnection board particularly suited for use in a photoelectric multifunction board, to a method of manufacturing the same, to a precursor for use in manufacturing optical waveguide interconnection board, to a photoelectric multifunction board including such an optical waveguide interconnection board, and to a method of manufacturing the same.

2. Description of the Related Art

In IC or LSI technology, attention has recently been drawn to optical interconnections being used between devices, between boards inside equipment, or within a chip to improve operating speed or degree of integration in place of high-density electric wiring. Optical interconnections in high-speed, large-capacity, optical-communication systems use electronic devices to process the transmitted optical signals and thus need photoelectric multifunction devices.

For example, Japanese Patent Application Laid-Open (JP-A) No. 2003-114365 discloses an optical path-changing device for forming optical interconnections, that includes: an array-type photoelectric conversion unit having photoelectric conversion elements; an array-type optical waveguide unit having optical waveguides which have different lengths and each of which has at least one cut end having an angle of 45° with respect to the plane of the optical waveguide and serving as a mirror; and an optical waveguide for optically coupling one of the photoelectric conversion elements and one of the optical waveguides.

In recent years, the development of mobile instruments with radio-communication functions has been significant, and attempts have been made to replace a part of their electric connections with optical connections. Optical connections offer high speed and absence of electromagnetic induction, and are meant to address the problems of electromagnetic interference (EMI) from electric boards, low resistance against radio wave intrusion from outside, or signal irregularity (SI) caused by an incomplete connection.

For example, JP-A No. 2003-131081 discloses optical connection of a photoelectric multifunction board that includes a laminate of an optical waveguide board and an electric circuit board, and an optical device such as a light-emitting device or a light-receiving device. An electric chip including an optical pin and the optical device is used in the optical connection, and the optical pin is inserted into a guide hole in the optical waveguide board. JP-A No. 2003-57468 discloses a photoelectric multifunction board that includes an electric circuit board, an optical waveguide sheet, and an optical device (light-emitting or—receiving device) equipped with an optical path-changing means and embedded in the core portion of the optical waveguide sheet. The optical waveguide sheet with the optical device embedded therein is laminated on the electric circuit board.

However, none of the array-type optical waveguide unit, the optical waveguide board, and the optical waveguide sheet as disclosed in JP-A Nos. 2003-114365, 2003-131081 and 2003-57468 has a pre-installed means for changing the travelling direction of light therein. In particular, there is no disclosure concerning an element for changing the direction of light in a plane parallel to the surface of the optical waveguide or the optical waveguide sheet.

The photoelectric multifunction board disclosed in JP-A No. 2003-57468 uses an optical waveguide sheet rather than an optical waveguide line. In such a case, although the optical waveguide sheet needs no special processing, the optical device equipped with an optical path-changing means is large in size, and thus a significantly higher degree of integration cannot be expected from such a device. Additionally, different types of optical path changes require different types of devices having an optical path-changing means. The optical waveguide sheet cannot focus light on the target of signal transmission and thus only a part of the light can form signals to be transmitted. Therefore, the energy efficiency is very low, and then it is necessary to increase the amount of light emission from the light-emitting device, which shortens the life of the device.

Thus, there have been needs for: an optical waveguide interconnection board which has a light direction-changing element within a patterned optical circuit and can form highly integrated optical connections; a method of manufacturing the same; a photoelectric multifunction board; a method of manufacturing the same; and a precursor for use in manufacturing the optical waveguide interconnection board.

SUMMARY OF THE INVENTION

The above needs can be met by providing the optical waveguide interconnection board, the method of manufacturing the same, the photoelectric multifunction board, the method of manufacturing the same, and the precursor for use in manufacturing the optical waveguide interconnection board, as described below.

A first aspect of the invention provides an optical waveguide interconnection board, including: an optical input port; an optical output port; at least one optical waveguide which corresponds to an optical circuit pattern; and at least one light direction-changing element each of which is disposed between the optical input port or the optical output port and one of the at least one optical waveguide or, when the optical waveguide interconnection board has two or more optical waveguides, between two of the optical waveguides, and which includes at least one light direction-changing element A that changes the direction of light in a plane parallel to a plane of the optical waveguide interconnection board and/or at least one light direction-changing element B that changes the direction of light to a direction having an angle with respect to a plane parallel to the plane of the optical waveguide interconnection board.

A second aspect of the invention provides a method of manufacturing the optical waveguide interconnection board, including: forming on a substrate at least one light direction-changing element A for changing the direction of light in a plane parallel to a plane of the optical waveguide interconnection board and/or at least one light direction-changing element B for changing the direction of light to a direction having an angle with respect to a plane parallel to the plane of the optical waveguide interconnection board; and forming at least one optical waveguide corresponding to an optical circuit pattern on the substrate having the at least one light direction-changing element A and/or the at least one light direction-changing element B.

A third aspect of the invention provides a method of manufacturing the optical waveguide interconnection board, including: providing a mold having a mold substrate and, on the mold substrate, at least one first pit corresponding to a light direction-changing element A for changing the direction of light in a plane parallel to a plane of the optical waveguide interconnection board and/or at least one second pit corresponding to a light direction-changing element B for changing the direction of light to a direction having an angle with respect to a plane parallel to the plane of the optical waveguide interconnection board; filling the at least one first pit and/or the at least one second pit of the mold with a resin and transferring the shape or shapes of the at least one first pit and/or the at least one second pit to the resin to form a resin substrate having at least one light direction-changing element A and/or at least one light-direction-changing element B; and forming at least one optical waveguide corresponding to an optical circuit pattern on the resin substrate.

A fourth aspect of the invention provides a precursor for use in manufacturing an optical waveguide interconnection board, including at least one light direction-changing element and a lower clad for an optical waveguide, wherein the at least one light direction-changing element includes at least one light direction-changing element A that will change the direction of light in a plane parallel to a plane of the optical waveguide interconnection board and/or at least one light direction-changing element B that will change the direction of light to a direction having an angle with respect to a plane parallel to the plane of the optical waveguide interconnection board.

A fifth aspect of the invention provides a photoelectric multifunction board including a laminate of the optical waveguide interconnection board and an electric circuit board.

A sixth aspect of the invention provides a photoelectric multifunction board, including: a laminate of the optical waveguide interconnection board and an electric circuit board; and an optical device or a combination of an optical device and an electric device, which is mounted on the electric circuit board.

A seventh aspect of the invention provides a method of manufacturing the photoelectric multifunction board of the sixth aspect, including: laminating the optical waveguide interconnection board and an electric circuit board; mounting an optical device or a combination of an optical device and an electric device; and simultaneously soldering the optical device or the combination of the optical device and the electric device.

The optical waveguide interconnection board of the invention has the light direction-changing element A and/or B provided in an optical waveguide(s) and thus is capable of changing the direction of light in a plane parallel to the board plane, of changing the direction of light to a direction having an angle with respect to a plane parallel to the board plane, or of changing the direction of light in both these modes. Thus, the optical waveguide interconnection board of the invention can receive or output light at any location and can form optical connections in high density and is therefore suited for use in a photoelectric multifunction board. The optical waveguide interconnection board of the invention is capable of not only changing the direction of light but also of dividing light.

The method of manufacturing the optical waveguide interconnection board according to the invention includes simultaneously forming the light direction-changing element A and/or B on a substrate and forming at least one optical waveguide thereon, and thus has good productivity. The method of manufacturing the optical waveguide interconnection board according to the invention allows a high-density or complicated optical circuit pattern to be easily produced.

BRIEF DESCRIPTION OF THE DRAWINGS

Preferred embodiments of the invention will be described in detail based on the following figures, wherein:

FIG. 2 is a diagram showing an embodiment of the optical waveguide provided with a light direction-changing element A for changing the direction of light by an angle of more than 90°;

DETAILED DESCRIPTION OF THE INVENTION

Optical Waveguide Interconnection Board

Figure 1:
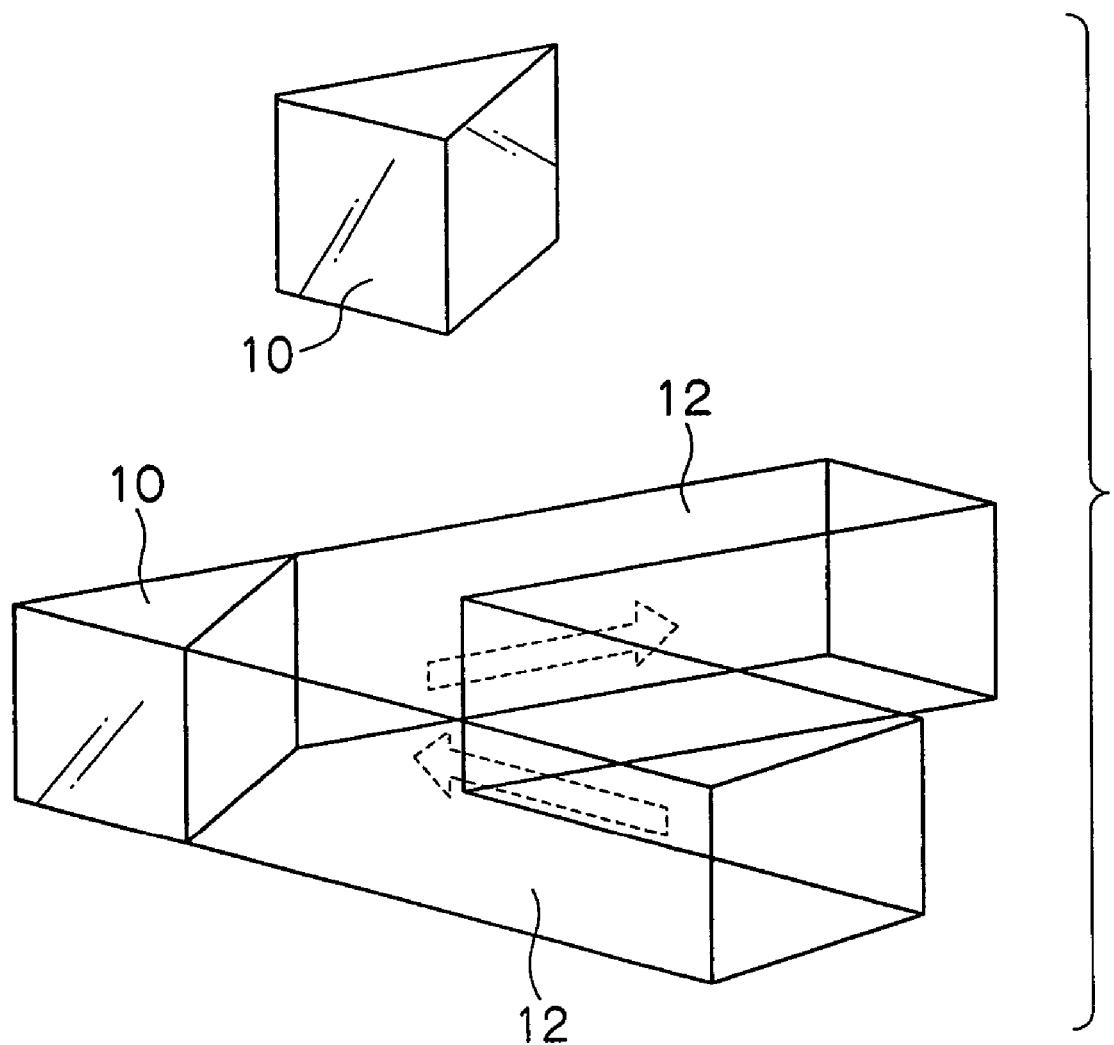
FIG. 1 is a diagram showing an embodiment of the optical waveguide provided with a light direction-changing element A for changing the direction of light by 90°.

The optical waveguide interconnection board of the invention has: an optical input port; an optical output port; at least one optical waveguide which corresponds to an optical circuit pattern; and at least one light direction-changing element each of which is disposed between the optical input port or the optical output port and one of the at least one optical waveguide or, when the optical waveguide interconnection board has two or more optical waveguides, between two of the optical waveguides, and which includes at least one light direction-changing element A that changes the direction of light in a plane parallel to a plane of the optical waveguide interconnection board, namely that turns light from one direction which is parallel to the plane to another direction which is also parallel to the plane, and/or at least one light direction-changing element B that changes the direction of light to a direction having an angle with respect to a plane parallel to the plane of the optical waveguide interconnection board, namely that turns light from one direction which is parallel to the plane to another direction which is not parallel to the plane, or vice versa.

Herein, each of the optical input and output ports can be an end portion of an optical waveguide board at which the end face of the core of the optical waveguide is exposed, or an end portion of an opening which is not a part of the core of an optical waveguide. Therefore, the light direction-changing elements A and B may have an end portion serving as the optical input or output port. As described above, the "light direction-changing element B" includes a "light direction-changing element that changes the direction of light from a direction having an angle with respect to the plane of the optical waveguide interconnection board (direction not parallel to the plane) to a direction parallel to the plane of the board."

When one light direction-changing element is provided, a waveguide (a core portion) is provided between the light direction-changing element and the optical input or output port. When two or more light direction-changing elements are provided, waveguides are provided between the light direction-changing elements, between the light direction-changing element and the optical input port, and between the light direction-changing element and the optical output port, according to optical circuit pattern.

In the optical waveguide interconnection board of the invention, various types of optical circuit patterns can be realized and the degree of integration of optical connections can be increased by combining the light direction-changing elements A and B.

An optical waveguide interconnection board having a high degree of integration of optical connections can be simply manufactured by, for example, forming a simple optical waveguide pattern, such as a pattern having parallel optical waveguides and an optical waveguide or waveguides that perpendicularly intersect with the parallel optical waveguides, and providing the light direction-changing elements A and B in predetermined positions.

In the optical waveguide interconnection board of the invention, the optical waveguide has a lower clad portion, a core portion and an upper clad portion, and the core portion is surrounded by the lower and upper clad portions. The optical waveguide(s) is disposed in accordance with a desired optical circuit pattern. The optical waveguide(s) and the light direction-changing element(s) form an optical circuit.

The light direction-changing element A turns light toward one or more directions within a plane parallel to the plane of the optical waveguide interconnection board (one or more directions which are parallel to the plane and intersect with each other).

The light direction-changing element A preferably has a light-reflecting surface that reflects light so as to change the direction of the light. The light direction-changing element A having the light-reflecting surface may have any shape, as long as it has at least one light-reflecting surface perpendicular to the plane of the optical waveguide interconnection board for the purpose of changing the direction of light within the plane of the board. A certain shape may be selected in view of easiness of the manufacturing method. Examples of the shape include, but are not limited to, a triangle pole, a rectangular parallelopiped and a cube. In order to change the direction of incident light by 90°, the light-reflecting surface may be inclined with respect to the direction of the incident light by 45°. In order to turn incident light by an acute angle, which is less than 90°, the light-reflecting surface may be inclined with respect to the direction of the incident light by an angle of more than 45° and less than 90°.

The light-reflecting surface may be a plane or a curved surface such as a concave surface.

For example, the light direction-changing element A shown in FIG. 1 is a triangle pole. It can be formed by cutting rectangular parallelopiped bodies, which have a square side face of the same size and an intersecting portion at one end portion thereof, along a plane including the diagonal lines of the upper and lower surfaces of the intersecting portion. In FIG. 1, reference numerals 10 and 12 represent the light direction-changing element A and the core of an optical waveguide, respectively, and arrows indicate the travelling direction of light. Arrows in FIGS. 2 to 8 also indicate the travelling direction of light.

The light direction-changing element A shown in FIG. 2 has a light-reflecting surface (plane) inclined with respect to the direction of incident light by an angle (10A) of more than 45° and thus can more acutely change the direction of light travel.

Figure 3A:
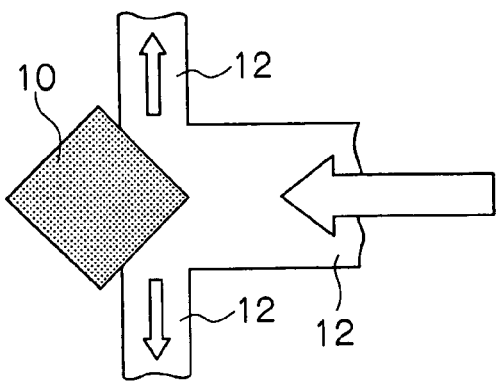
FIGS. 3A to 3D are each a diagram showing an embodiment of the optical waveguide provided with a light direction-changing element A which divides light.
Figure 3B:
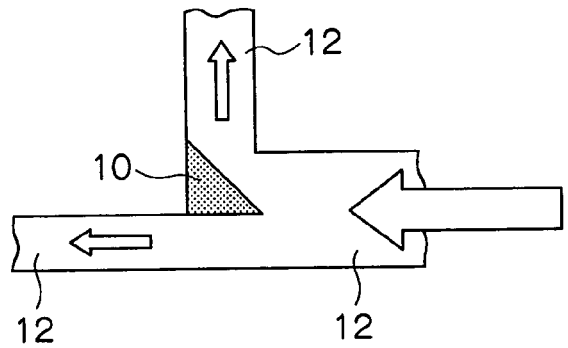
Figure 3C:
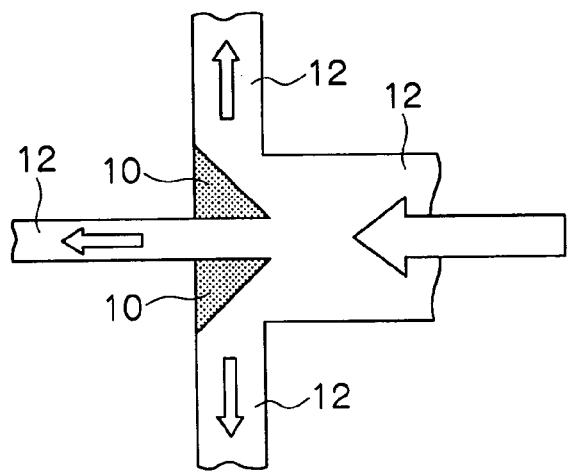
Figure 3D:
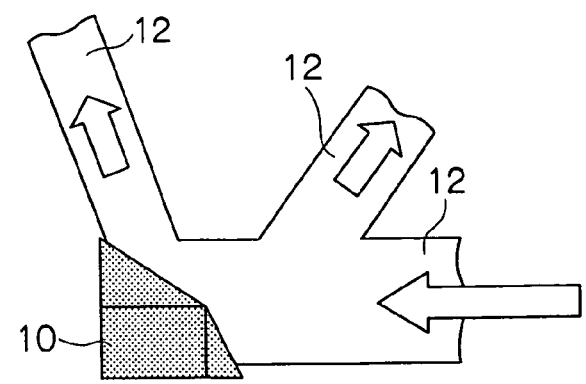

The light direction-changing element A may have a structure that divides an incident light beam into at least two beams and turns them toward different directions. FIGS. 3A to 3D show some embodiments in which light is divided with a light direction-changing element A having at least one light-reflecting plane. FIG. 3A shows that a light beam from one direction is divided into two light beams, whose travelling directions have been changed from the one direction by 90°. FIG. 3B shows that a light beam from one direction is divided into two light beams, that one of the two light beams goes straight without changing the travelling direction thereof, and that the other goes in a direction perpendicular to the one direction. FIG. 3C shows that a light beam from one direction is divided into three light beams, that one of the three goes straight without changing the travelling direction thereof, and that the other two go in directions perpendicular to the one direction. FIG. 3D shows that a light direction-changing element A has a first light-reflecting surface inclined with respect to the direction of incident light by an angle of more than 45° and a second light-reflecting surface which is adjacent to the first light-reflecting surface and inclined to the incident direction by an angle of less than 45°, that the incident light beam is divided into two light beams, that one of the two light beams is turned by an angle of more than 90°, and that the other is turned by an angle of less than 90°.

Figure 4:
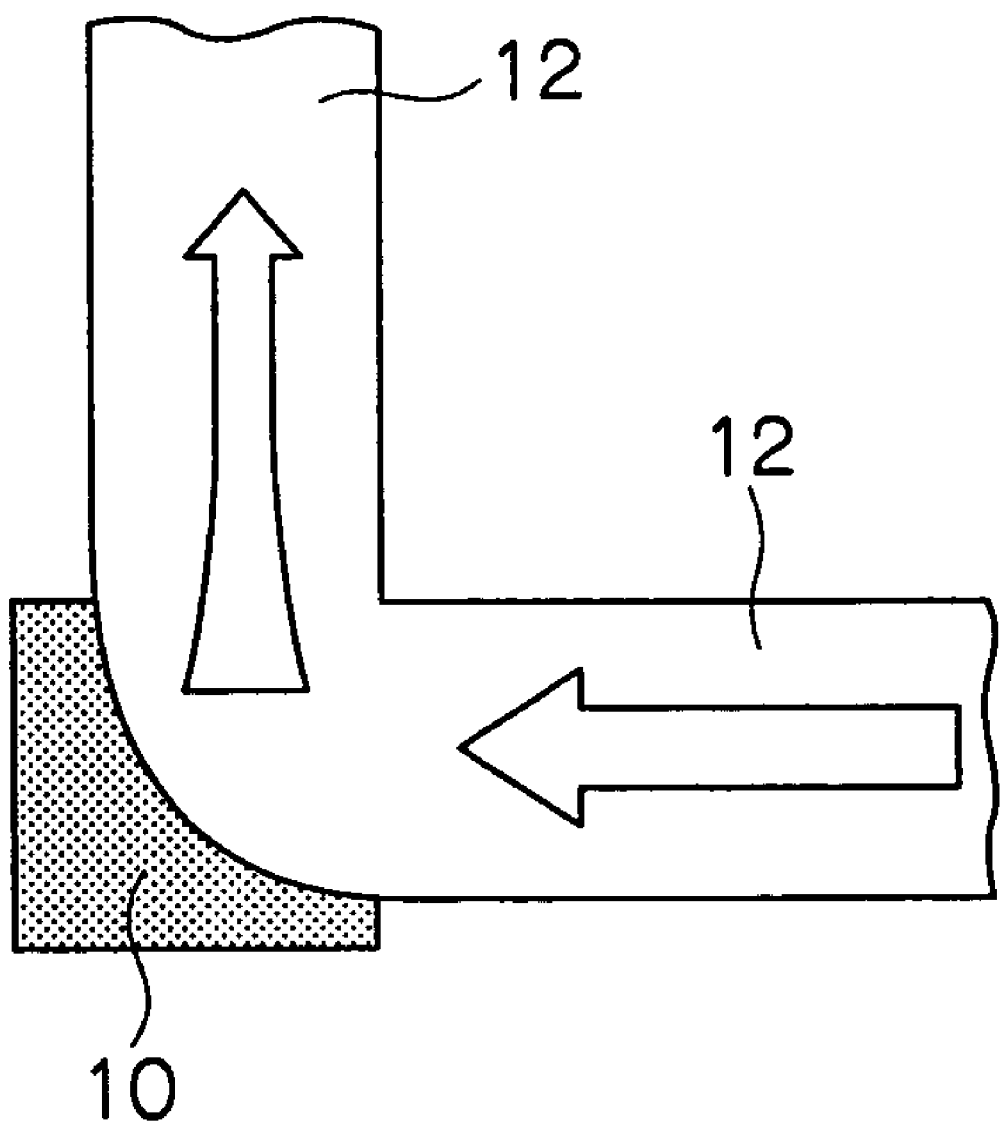
FIG. 4 is a diagram showing an embodiment of the optical waveguide provided with a light direction-changing element A having a concave light-reflective portion.

FIG. 4 shows another embodiment in which a light direction-changing element A having a concave light-reflecting surface is used. In this embodiment, the light direction-changing element A not only changes the direction of light but also condenses light. In FIG. 4, reference numeral 10 represents the light direction-changing element A, which can be formed by conducting a cutting process which is the same as that in preparation of the light direction-changing element A of FIG. 1 except that a concave cut surface is formed in place of the plane.

The light direction-changing element B changes the direction of incident light to a direction having an angle with respect to a plane parallel to the plane of the optical waveguide interconnection board.

As in the element A, the light direction-changing element B preferably has a light-reflecting surface that serves as a light direction-changing surface. The light-reflecting surface may be a plane or a curved surface such as a concave surface. The light-reflecting surface has an angle with respect to the plane of the optical waveguide interconnection board and may be placed perpendicularly to waveguides that transmit light before or after the change of the travelling direction.

The light direction-changing element B which has the light-reflecting surface and changes the direction of light to a direction having an angle with respect to a plane parallel to the plane of the optical waveguide interconnection board may have any shape, as long as it has at least a light-reflecting surface which forms an angle with respect to the plane of the board. A certain shape may be selected in view of easiness of the manufacturing method. Examples of the shape include, but are not limited to, shapes having a triangle or trapezoid cross section such as the shape represented by reference numeral 20 in FIG. 11C.

In order to change the direction of incident light by 90°, the light-reflecting surface may be inclined with respect to the direction of the incident light by 45°. In order to turn incident light by an angle of less than 90° (acutely), the light-reflecting surface may be inclined with respect to the incident light at an angle of more than 45° and less than 90°.

Figure 5A:
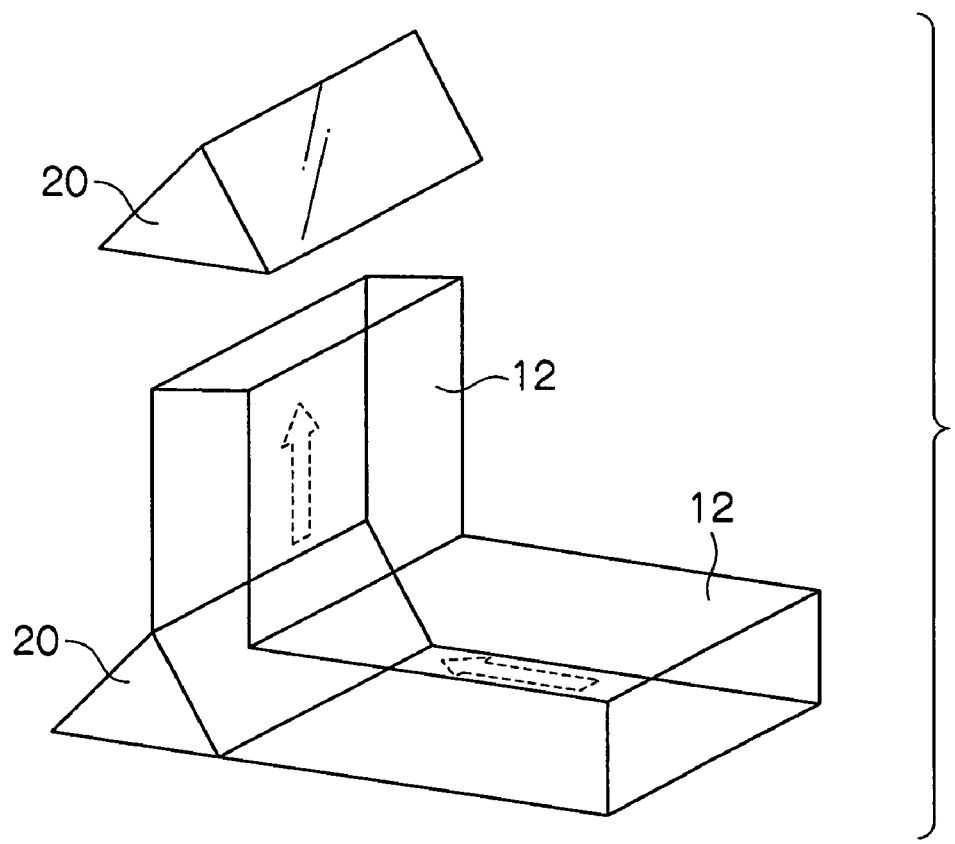
FIGS. 5A and 5B are each a diagram showing an embodiment of the optical waveguide provided with a light direction-changing element B.
Figure 5B:
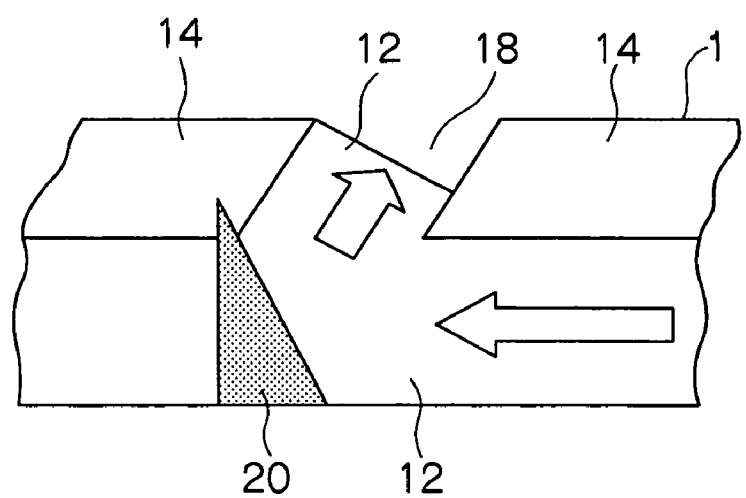

FIGS. 5A and 5B each show an embodiment of the light direction-changing element B. In FIG. 5A, reference numerals 20 and 12 represent the light direction-changing element B and the core of an optical waveguide, respectively. Light can be input and turned in a path opposite to that indicated by arrows. FIG. 5B shows that the light-reflecting surface is inclined with respect to the plane 1 of the board by an angle of more than 45°, that light is turned by an angle of more than 90° and output from an optical output port 18 that is an opening (an optical connection port). Reference numeral 18 in FIGS. 6 to 8 also represents an optical output port. In FIG. 5B, reference numeral 14 represents a clad.

Figure 6A:
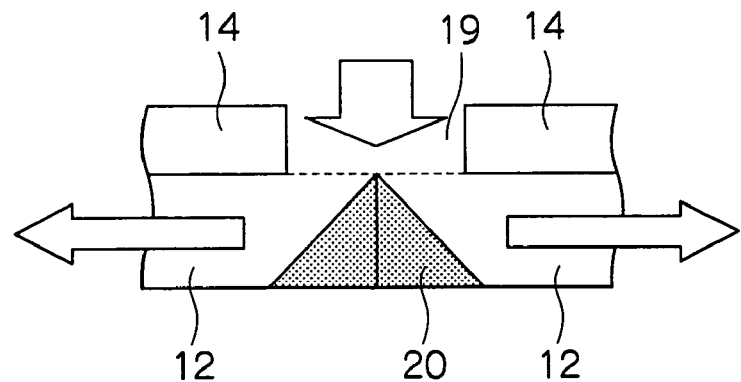
FIGS. 6A to 6C are each a diagram showing an embodiment of the optical waveguide provided with a light direction-changing element B which divides light.
Figure 6B:
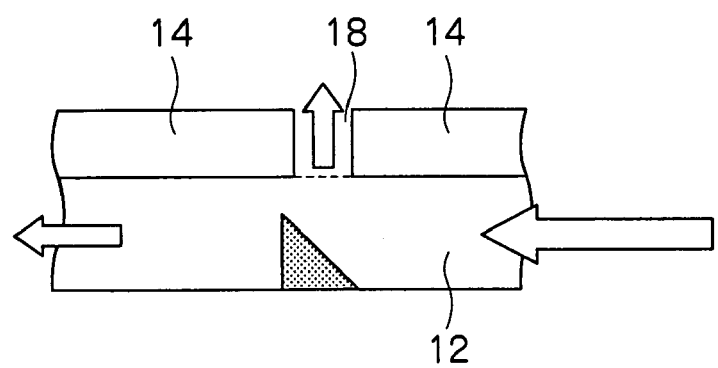
Figure 6C:
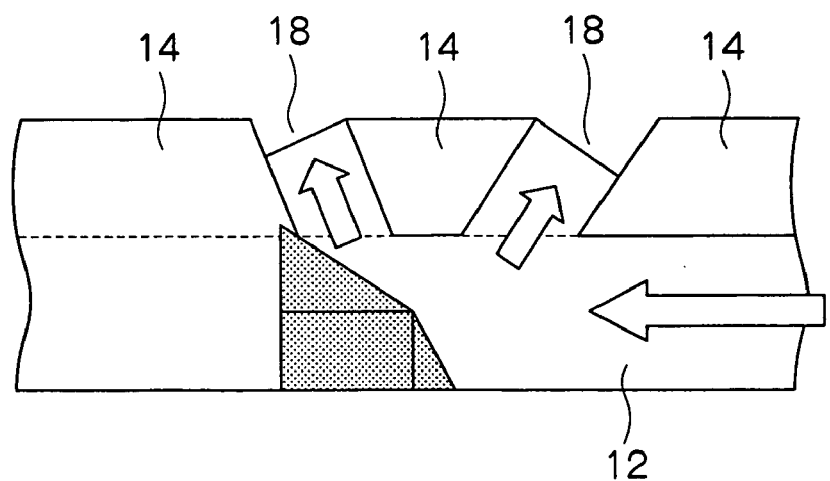
Figure 8A:
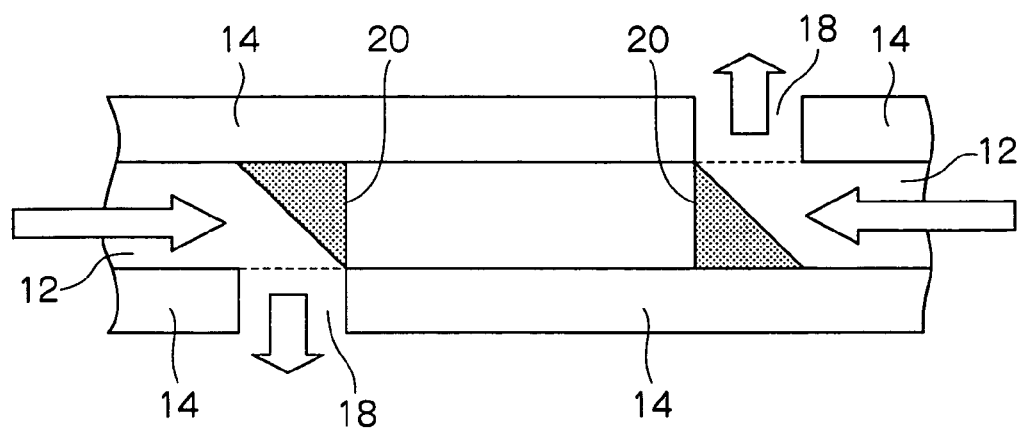
FIGS. 8A and 8B are each a diagram showing an embodiment of the optical waveguide interconnection board having optical connection ports on both sides thereof.
Figure 8B:
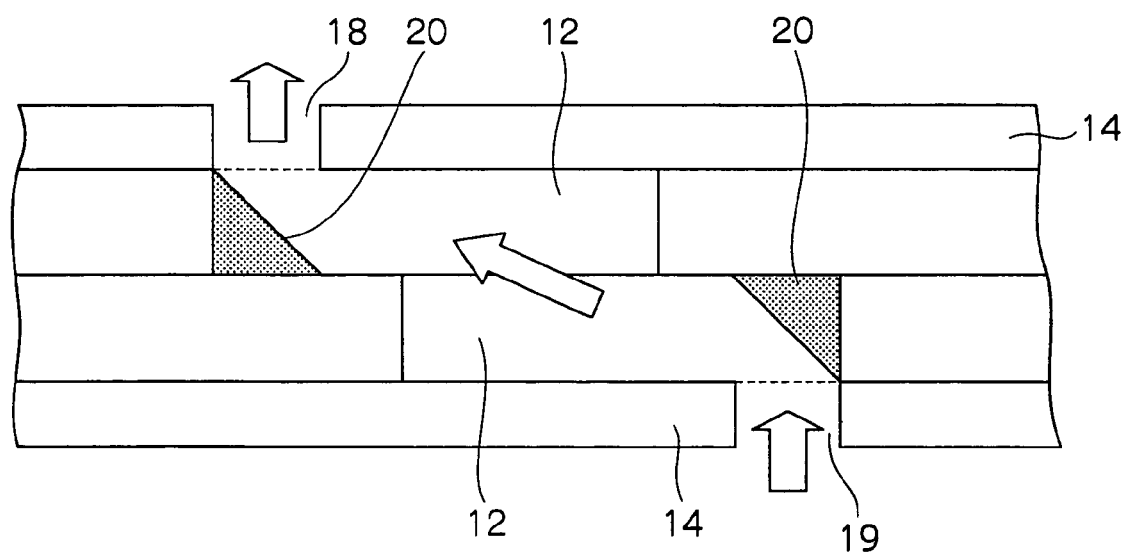

The light direction-changing element B may have a structure that that divides an incident light beam into at least two beams and turns them toward different directions. FIGS. 6A to 6C show embodiments of such a light direction-changing element. FIG. 6A shows a structure having a light direction-changing element B with two light-reflecting surfaces each inclined with respect to the direction of incident light by 45°, whereby an incident light beam is divided into two light beams, whose directions have been changed from the direction of the incident light beam by 90°. The structure shown in FIG. 6B is characterized in that the light direction-changing element B used has a light-reflecting surface inclined with respect to the incident light beam by 45°, and that the height of the light direction-changing element B (in a direction perpendicular to the plane of the optical waveguide interconnection board which plane includes to the longitudinal direction of the optical waveguide) is shorter than that of the core, and that the incident light beam is divided into two light beams, and that one of them goes straight, and that the direction of the other is perpendicular to the direction of the incident light beam. FIG. 6C shows that the light direction-changing element B has a height equal to or higher than that of the core and has two light-reflecting surfaces inclined with respect to the plane of the board which plane includes the longitudinal direction of the waveguide by different angles, whereby the incident light beam is divided into two light beams going in different directions. In FIG. 8B, reference numeral 19 represents an optical input port.

The light-reflecting surface of the light direction-changing element A or B preferably has a light-reflecting film, which may be a film of a metal such as gold or aluminum or a film having so-called metallic luster, such as a TiN film.

The optical waveguide interconnection board of the invention may have a structure in which optical waveguides intersect with each other in a plane parallel to the board (optical waveguides intersect with each other and are parallel to the plane of the board), or a structure in which at least one optical waveguide parallel to the plane of the board intersect with at least one optical waveguide perpendicular to (the plane of) the board.

Figure 7A:
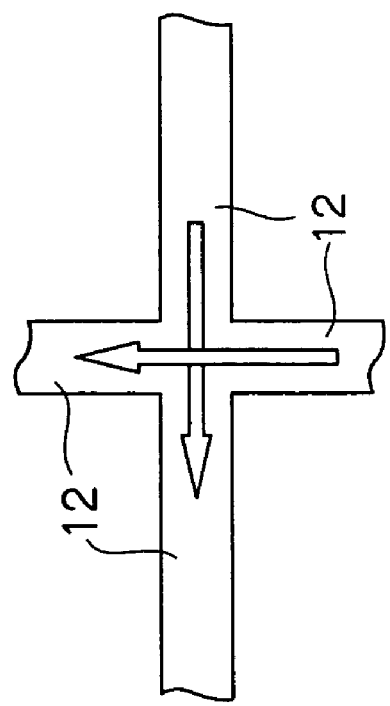
FIG. 7A is a diagram showing optical waveguides for allowing light beams which straight advance to intersect with each other.
Figure 7B:
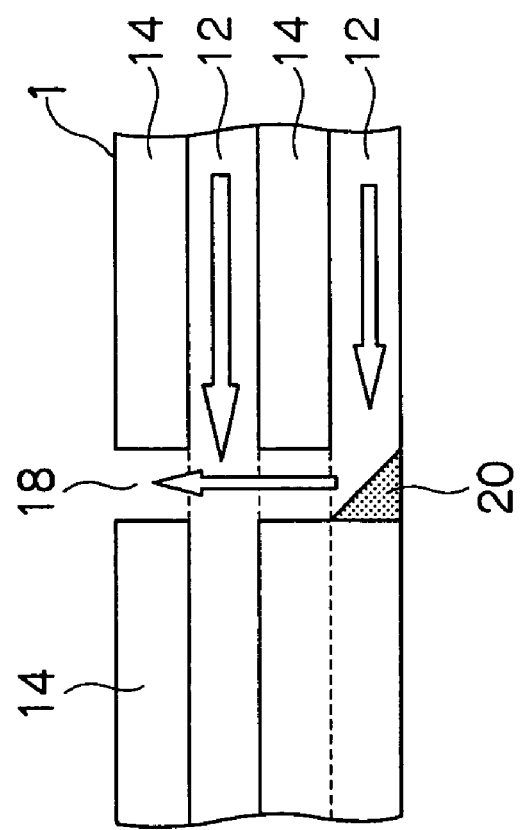
FIG. 7B is a diagram showing optical waveguides for allowing light beams, one of which is perpendicularly turned, to intersect with each other.

FIG. 7A is a schematic diagram showing an optical waveguide interconnection board having a structure in which optical waveguides intersect with each other in a plane parallel to the board (optical waveguides intersect with each other and are parallel to the (plane of the) board. FIG. 7B is a schematic diagram showing an optical waveguide interconnection board having a structure in which optical waveguides parallel to the plane 1 of the board intersect with an optical waveguide perpendicular to the plane 1 of the board. In FIG. 7B, reference numeral 20 represents the light direction-changing element B.

The optical waveguide interconnection board of the invention may also have an opening, which serves as an optical connection port (an optical input or output port), on each surface side thereof. FIG. 8A shows an embodiment in which optical output ports 18 are provided on both surface sides of the optical waveguide interconnection board. FIG. 8B shows an embodiment in which optical signals are input from an optical input port 14 provided on one surface side and output from an optical output port 18 provided on the other surface side.

Any known core material and clad material may be used to form the optical waveguide of the invention.

The optical waveguide interconnection board of the invention may be stacked on an electric circuit board to form a photoelectric multifunction board. In such a case, it is preferable that the core and clad materials should be heat-resistant so as to withstand soldering temperature in a process of manufacturing the photoelectric multifunction board. The upper temperature limit of the core and clad materials is about 280° C. or higher, and preferably about 300° C. or higher. Examples of such a heat-resistant material include, but are not limited to, polyimides, epoxy acrylic materials and polysilanes.

It is preferable that the material of the light direction-changing elements A and B have a good reflection property in terms of optical properties. The same is true in the case of the concave light-reflecting surface. The concave light-reflecting surface is preferably made of a material having optical properties the same as or close to those of a clad portion.

It is necessary that the material of the light direction-changing elements A and B also have substantially the same heat resistance as that of each of the clad and core.

Figure 12A:
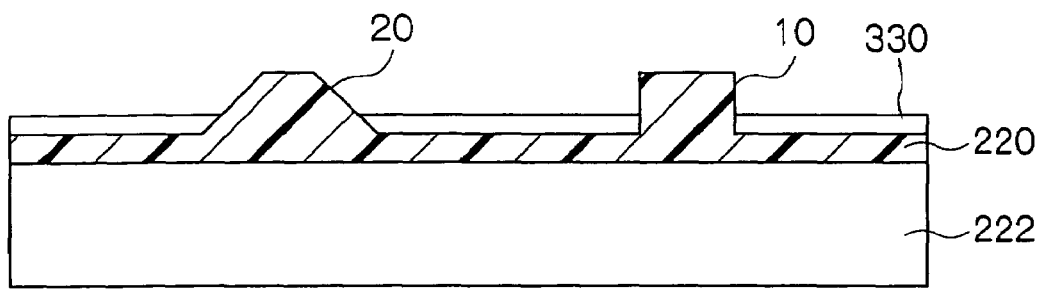
FIGS. 12A to 12C are diagrams showing a process of forming a lower clad, a core and an upper clad on the resin substrate.
Figure 12B:
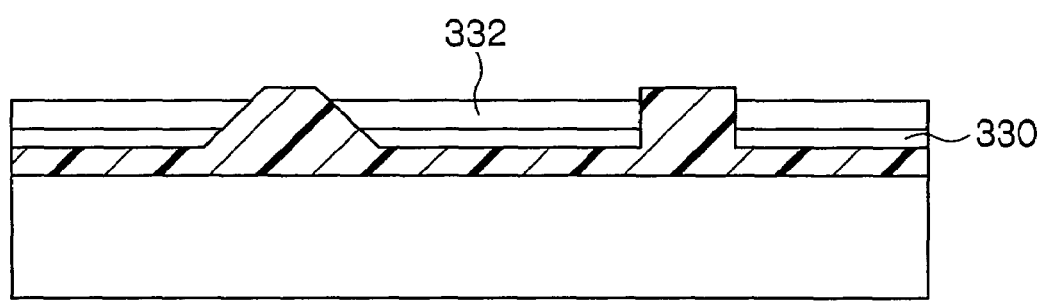
Figure 12C:
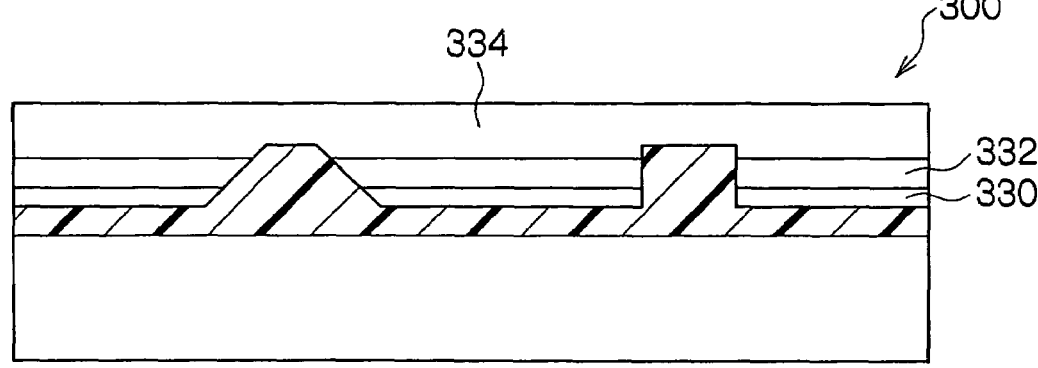

In a case where a lower clad, a core and an upper clad are stacked on the light direction-changing element A or B, the height of the light direction-changing element A or B from the bottom side and the thickness of each of the lower clad and the core are preferably such that the top of the light direction-changing element A or B reaches the boundary between the core and the upper clad, or the inside of the upper clad (see FIG. 12C). In a case where the light direction-changing element is formed as shown in FIG. 6B, however, the top of the light direction-changing element B is placed inside the core.

Method of Manufacturing Optical Waveguide Interconnection Board

For example, the optical waveguide interconnection board of the invention is prepared by one of manufacturing methods described below. A first method of manufacturing the optical waveguide interconnection board includes: providing a mold having a mold substrate and, on the mold substrate, at least one first pit corresponding to a light direction-changing element A for changing the direction of light in a plane parallel to a plane of the optical waveguide interconnection board and/or at least one second pit corresponding to a light direction-changing element B for changing the direction of light to a direction having an angle with respect to a plane parallel to the plane of the optical waveguide interconnection board; filling the at least one first pit and/or the at least one second pit of the mold with a resin and transferring the shape or shapes of the at least one first pit and/or the at least one second pit to the resin to form a resin substrate having at least one light direction-changing element A and/or at least one light-direction-changing element B; and forming at least one optical waveguide corresponding to an optical circuit pattern on the resin substrate.

A second method includes: forming on a substrate at least one light direction-changing element A for changing the direction of light in a plane parallel to a plane of the optical waveguide interconnection board and/or at least one light direction-changing element B for changing the direction of light to a direction having an angle with respect to a plane parallel to the plane of the optical waveguide interconnection board; and forming at least one optical waveguide corresponding to an optical circuit pattern on the substrate having the at least one light direction-changing element A and/or the at least one light direction-changing element B.

First Method

The first method will be described below in detail. The mold having, on a mold substrate, at least one first pit corresponding to the light direction-changing element A for changing the direction of light in the plane parallel to the plane of the optical waveguide interconnection board and/or at least one second pit corresponding to the light direction-changing element B for changing the direction of light to the direction having an angle with respect to the plane parallel to the plane of the optical waveguide interconnection board can be manufactured by, for example, a method including: providing, on the mold substrate, an etching mask having at least one opening corresponding to the shape of the bottom face of the light direction-changing element A and/or B, and etching the mold substrate to form the pit(s). The mask may be formed by light-exposure of a positive photoresist layer via a photomask and development of the exposed photoresist layer.

Alternatively, a machining method such as a cutting method may preferably be used. The mold substrate may be a silicon (100) substrate, or, in the machining method, a general metal plate or an aluminum block. When the silicon (100) substrate is used as the mold substrate in the above method, a pit having a slant face can easily be formed by anisotropic etching.

The pit(s) of the mold is filled with the resin so that the shape(s) of the pit(s) is transferred to the resin. Thus, the resin substrate having the light direction-changing element A and/or B is prepared. Specifically, the preparing method may include: applying a curable resin to the pit-formed surface of the mold; curing the resin to form a cured layer; and separating the cured layer from the mold, or may include: placing a heat-softenable resin substrate on the pit-formed surface of the mold; and pressing the resin substrate against the mold to transfer the shape(s) of the pit(s) while the resin is being heated and softened.

The curable resin may be a thermosetting resin, an ultra-violet-curable resin, or en electron beam-curable resin. In a case where the optical waveguide interconnection board of the invention is used in a photoelectric multifunction board and a soldering step is required in an assembling process, it is preferable that the curable resin has heat resistance. The upper temperature limit of the curable resin is about 280° C. or higher, and preferably about 300° C. or higher. For example, polyimide is used. For example, the heat-softenable resin substrate may be a polyimide substrate having heat resistance.

The resin layer or the resin substrate and a support may be bonded together to reinforce the resin layer or the resin substrate. Curing the resin and bonding the support to the resin layer or substrate may be performed at the same time. For example, the support may be a resin support.

A light-reflecting film to improve optical mirror properties may be formed on the surface of the resin substrate having the light direction-changing element A and/or B. The light-reflecting film may be a gold film, a gold alloy film, or a nitride film such as a TiN film, and may be formed by an ion-plating method, or a sputtering method. For example, when the light direction-changing element A or B is made of aluminum or silicon and thereby the light-reflecting portion has good light-reflecting property, the light-reflecting film may be omitted.

At least one optical waveguide corresponding to an optical circuit pattern is formed on the resin substrate having the light direction-changing element A and/or B. It is understood that the at least one optical waveguide can be formed between plural light direction-changing elements, and/or between the light direction-changing element and the optical input or output port. The optical waveguide has the light direction-changing element A and/or B, a lower clad, a core, and an upper clad. The lower clad may be formed by application of a clad material-containing liquid. After the lower clad is formed, very thin clad material adhering to the surface of the light direction-changing element A or B which surface is to be exposed may be removed with oxygen plasma.

The core is then formed on the lower clad. The core(s) is disposed in accordance with the optical circuit pattern. The core may be formed by a process in which a core material layer is formed on the lower clad and patterned by a conventional method. For example, the patterning method may be (1) a photo-bleaching method, (2) a reactive ion etching method (RIE method), or (3) a direct exposure method.

In the photo-bleaching method, an organopolysilane material ("Glasia" manufactured by Nippon Paint Co., Ltd.) is used and only the core portion is kept unexposed to ultraviolet light so as to obtain a difference between refractive index of the exposed portion(s) and that of the unexposed portion(s) (The ultraviolet-exposed portion has a reduced refractive index). Thus, this method does not need removal of the exposed portion(s).

The reactive ion etching method (2) includes: applying a negative photoresist to the core material layer, exposing the photoresist to light through a photomask, developing the photoresist to leave the resist layer only on a core portion, removing the non-core portion by reactive ion etching, and removing the photoresist from the core portion. When a silicon-containing resist is used as a mask material in this method, etching can easily be performed with normal oxygen plasma.

In the direct exposure method (3), a photosensitive material is used as a core material, directly exposed to light through a photomask, and then developed to form a pattern.

In particular, the photo-bleaching method using the organopolysilane material needs only the exposure of the core material layer to light and does not need any development or etching process as described above. Accordingly, this method provides a simple manufacturing process. Moreover, the organopolysilane material has heat resistance and an upper temperature limit of about 300° C. and thus is particularly useful for making a photoelectric multifunction board.

Next, the upper clad is formed on the core. The method of forming the upper clad is similar to that of forming the lower clad.

The surface of the upper clad may be flatted by polishing. In place of polishing, multilayer coating may be formed to form a flat clad layer.

Referring to drawings, an embodiment of the method of preparing the optical waveguide interconnection board will be described below, which include: preparing a mold having first and second pits obtained by anisotropic etching on a silicon (100) substrate (Si substrate) serving as the mold substrate, preparing a resin substrate having light direction-changing elements A and B with the mold, and forming an optical waveguide on the resin substrate.

Process of Preparing Mold Having First and Second Pits

Figure 9A:
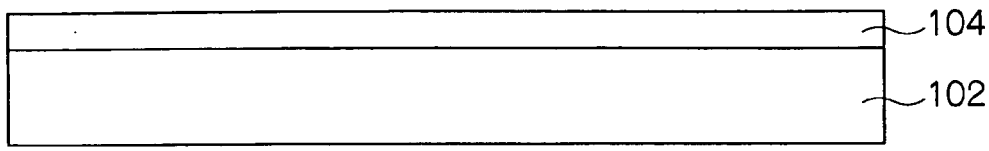
FIGS. 9A to 9F are diagrams showing a process of forming a first pit corresponding to a light direction-changing element B in a Si substrate by anisotropic etching, which process is a part of a method of manufacturing a mold.

FIGS. 9A to 9F are diagrams conceptually showing a process of forming the first pit in the mold substrate. FIG. 9A shows that a protective film 104 to protect a Si substrate 102 from anisotropic etching described later is formed on the Si substrate 102. For example, the protective film 104 may be a $Si_3N_4$ film or a $SiO_2$ film. When the $Si_3N_4$ film is used, it is preferable, but not essential, that a polysilicon film be laminated on the $Si_3N_4$ film to prevent the $Si_3N_4$ film from being damaged during processes which the $Si_3N_4$ film undergoes. The protective film may be formed by any known deposition method such as a plasma CVD method or a reduced-pressure CVD method. The $SiO_2$ film may be formed by a thermal oxidation method or a CVD method. Although FIG. 9A shows a protective film provided on one side for the sake of easy explanations, it is also necessary to protect the back side of the substrate from the etching liquid, and thus to provide the protective film on both sides.

Next, a positive photoresist is applied to the protective film. The resultant photoresist is exposed to light though a photomask having a light-transmitting portion corresponding to the shape of the bottom face of a desired light direction-changing element (for example, the shape of the bottom face is a rectangle when the light direction-changing element has a shape of triangle pole as shown in FIG. 5A) and developed to remove a portion corresponding to the shape of the bottom face from the photoresist layer 106. Thus, an opening is formed (see FIG. 9B).

When the shape of the bottom face of the light direction-changing element is rectangular, it is preferable that the opening of the photomask be rounded at their four corners rather than a true rectangle. In such a case, the opening in the protective layer 104 which opening is obtained in the process shown in FIG. 9D is an almost rectangle with four rounded corners, so that cracking can be prevented in the process of anisotropic etching (see FIG. 9F) described later. Without the rounded corners, the portions of the protective film at the four corners remain like eaves (namely, portions under the eaves will be undesirably etched) so that cracks may occur.

Figure 9B:
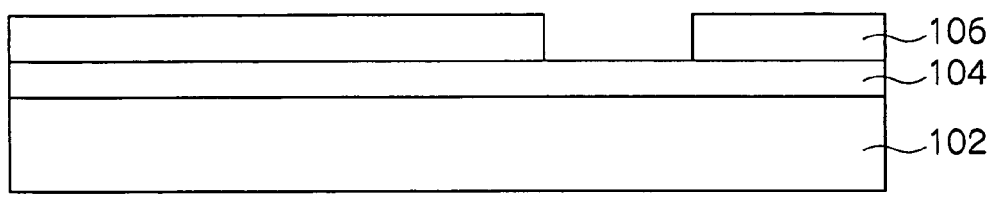
Figure 9C:
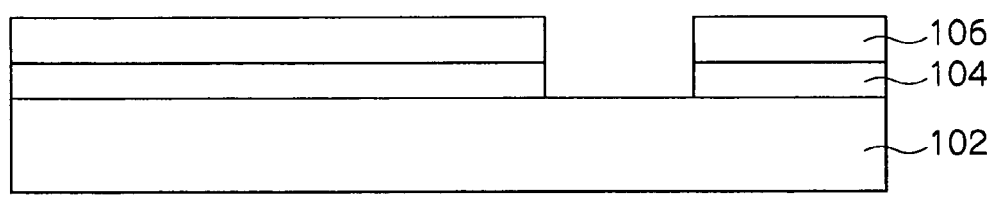
Figure 9D:
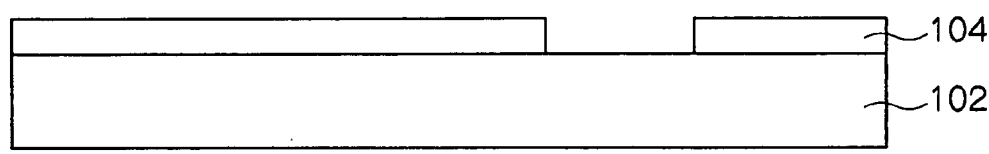
Figure 9E:
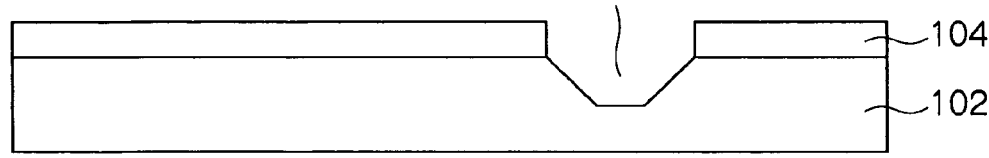

Thereafter, a half-finished product shown in FIG. 9B undergoes isotropic dry etching. Thereby, the protective film is partially removed so that the removed portion corresponds to the opening (see FIG. 9C). Then, the resist 106 is removed (see FIG. 9D). The removal of the resist is performed with a mixed liquid of hot sulfuric acid and hydrogen peroxide.

Thereafter, a first pit P1 (corresponding to a light direction-changing element B) is formed by anisotropic etching (see FIG. 9E) using an anisotropic etching liquid, which contains an alkali such as ethylenediamine or KOH. Specifically, a mixed liquid of ethylenediamine and pyrocatechol or a mixed liquid of KOH and isopropyl alcohol is used. However, any other liquid may be used as long as it can anisotropically etch silicon crystal.

Such anisotropic etching can produce a pit having faces inclined with respect to the substrate surface by just 45° because of crystal anisotropy.

Figure 9F:

Next, the protective film 104 is removed (see FIG. 9F). For example, hot phosphoric acid is used in the case of the $Si_3N_4$ protective film, while an aqueous solution of hydrofluoric acid is used in the case of the $SiO_2$ protective film. Thus, the Si substrate with the first pit can be obtained.

Figure 10A:
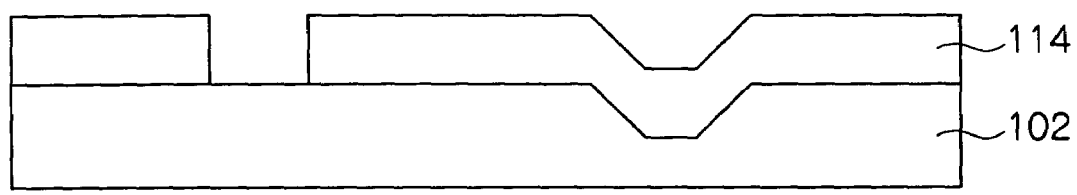
FIGS. 10A to 10C are diagrams showing a process of forming a second pit corresponding to a light direction-changing element A in the Si substrate having the first pit, which process is the rest of the method of manufacturing the mold.

As shown in FIG. 10A, an etching mask 114 is formed for the purpose of preparing a second pit (corresponding to a light direction-changing element A). The etching mask may be prepared by exposure and development of a photoresist, or by a method in which a $SiO_2$ film is formed by a deposition method such as a thermal oxidation method or a CVD method and in which an opening having a shape corresponding to the shape of the bottom face of the light direction-changing element (the shape is a right triangle in the case of the light direction-changing element as shown in FIG. 1A) is formed in the $SiO_2$ film by a photolithographic process. When dry etching will be conducted as described below, there is no need to form rounded corners.

Figure 10B:
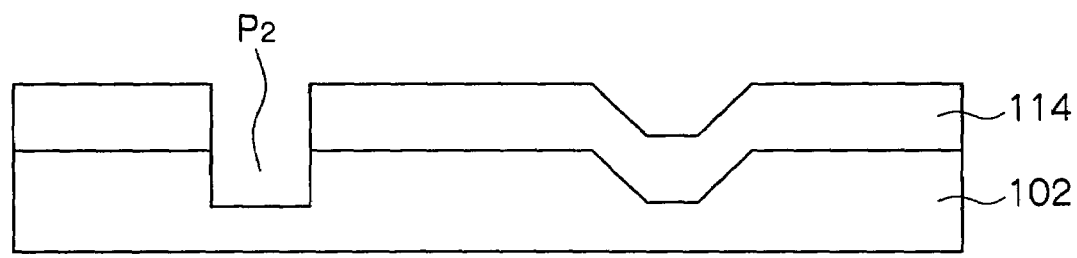
Figure 10C:
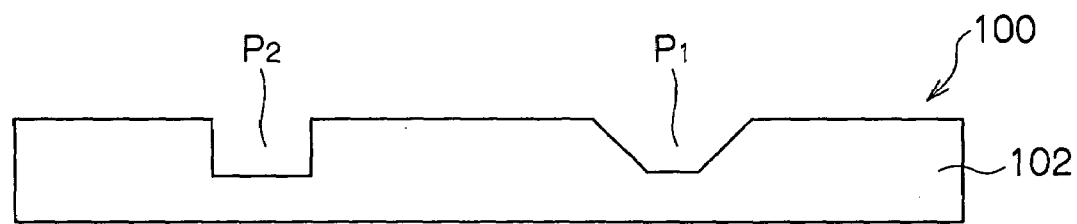

Thereafter, the substrate is etched by a dry etching method such as a reactive ion etching method (RIE method) to form a second pit P2 (see FIG. 10B). The etching mask 114 is then removed. A mold 100 is thus obtained (see FIG. 10C). An aqueous solution of hydrofluoric acid is used when the etching mask is the $SiO_2$ film. Meanwhile, a mixed liquid of hot sulfuric acid and hydrogen peroxide is used when the etching mask is the resist film. The resulting Si substrate (mold) has the first and second pits.

The depths of the first and second pits respectively correspond to the heights of the light direction-changing elements B and A and thus preferably have the above-described relationship with the thickness of each of the lower clad, the core and the upper clad, which will be formed in a subsequent process.

Process of Preparing Resin Substrate Having Light Direction-Changing Elements A and B Referring to FIGS. 11A to 11C, a process of preparing a resin substrate having light direction-changing elements A and B will be described below.

Figure 11A:
FIGS. 11A to 11C are diagrams showing a process of preparing a resin substrate having light direction-changing elements A and B with the mold.
Figure 11B:
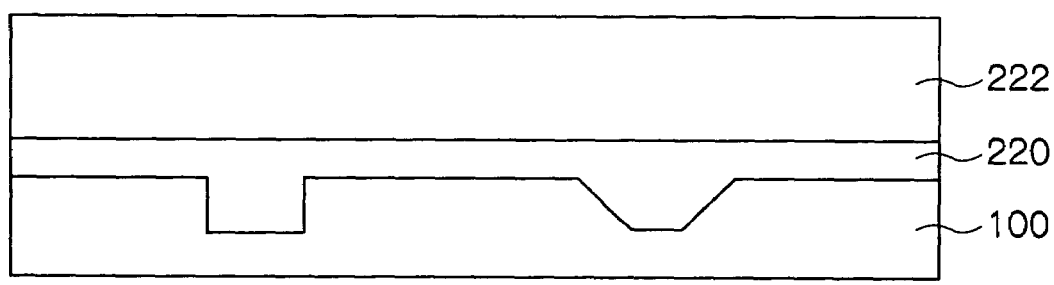
Figure 11C:
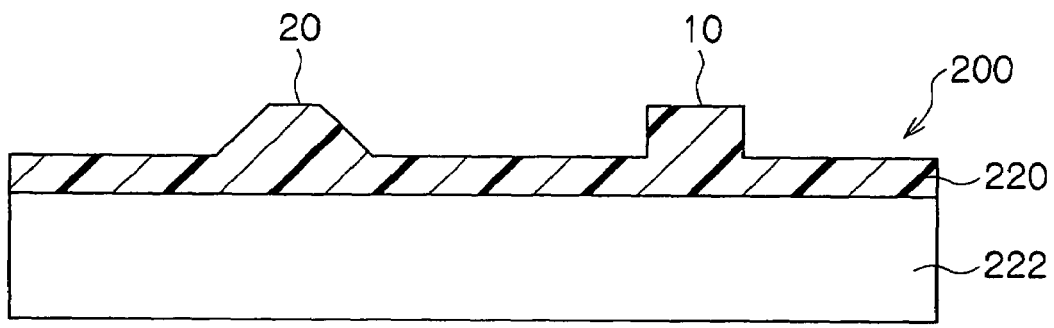

As shown in FIG. 11A, a curable resin 220a is applied to the mold thus prepared. When the resultant curable resin layer is thin, a suppor 222 is preferably laminated thereon as shown in FIG. 11B for the purpose of reinforcement of the curable resin layer. The applied resin is then cured to form a cured layer 220. The mold 100 is removed from the cured layer 220 to obtain a resin substrate 200 which has a light direction-changing element A represented by reference numeral 10 and a light direction-changing element B represented by reference numeral 20 (see FIG. 11C). Thereafter, a light-reflecting film for improving optical mirror properties may be formed on the surface of the resin substrate having the light direction-changing elements A and B, though such a process is not shown in the drawings.

Process of Forming Optical Waveguide on Resin Substrate Having Light Direction-Changing Elements As shown in FIGS. 12A to 12C, an optical waveguide is formed on the resin substrate having the light direction-changing elements. FIGS. 12A, 12B and 12C show the processes of forming a lower clad, a core and an upper clad, respectively. In FIG. 12A, reference numerals 220, 10, 20 and 330 represent the cured layer, the light direction-changing element A, the light direction-changing element B, and the lower clad, respectively. In FIG. 12B, reference numeral 332 represents the core. In FIG. 12C, reference numeral 334 represents the upper clad. After these processes, an optical waveguide interconnection board 300 of the invention is obtained.

The principal portion of the optical waveguide interconnection board of the invention is thus produced. An opening for optical connection is then formed in the resulting optical waveguide interconnection board. Such a process will be described in the section of photoelectric multifunction board described below.

In the first method, the mold of the Si substrate is used to form the resin substrate. Alternatively, a durable metal mold may be prepared by a process in which the mold of the Si substrate is subjected to electroforming (such as Ni electroforming) and then metal plating (such as Ni plating).

Second Method

The second method will be described below. In the second method, at least one light direction-changing element A and/or at least one light direction-changing element B is prepared in advance and then fixed onto a predetermined position or positions on a substrate by bonding. The light direction-changing element A or B may be prepared by precision working. Alternatively, a product with a slant face may be used, which slant face is prepared by anisotropic etching of a silicon substrate.

Next, at least one optical waveguide corresponding to an optical circuit pattern is formed on the resin substrate. The method of forming the optical waveguide may be the same as in the first method.

Photoelectric Multifunction Board

The photoelectric multifunction board of the invention has the optical waveguide interconnection board and an electric circuit board laminated on the optical waveguide interconnection board. The electric circuit board may be a printed circuit board. The lamination of the optical waveguide interconnection board and the electric circuit board may be performed by such a lamination method as soldering and bonding or by any other method such as a so-called build-up method in which an electric circuit board is formed on the optical waveguide board.

An optical device or a combination of an optical device and an electric device may be connected to the photoelectric multifunction board including the laminate of the optical waveguide interconnection board and the electric circuit board. The optical device may be an optical element such as VCSEL, LED or PD, or any other device such as a so-called optical multichip module (MCM) in which LSI is integrated with an optical I/O device. Examples of the electric device include all types of devices conventionally mounted on PWBA such as passive elements including chip condensers and large scale semiconductor devices including LSI or multichip modules.

The optical waveguide interconnection board is provided with an opening for introducing light whose direction is to be changed by the light direction-changing element B from the outside of the optical waveguide interconnection board (an opening for optical connection), or an opening for outputting the light whose direction has been changed by the light direction-changing element B to the outside of the optical waveguide interconnection board. Light is input or output via such an opening. The opening is formed by removing the upper clad by etching in such a manner that the etched portion reaches the core. The opening is preferably filled with a waveguide material having a refractive index similar to that of the core. A light direction-changing element B is placed at the intersection of the core and the opening. Thereby, input light passes through the opening and is turned by the light direction-changing element B so that the direction of the light is parallel to the plane of the optical waveguide interconnection board. Alternatively, light whose direction is parallel to the plane is turned by the light direction-changing element B and then passes through the opening and becomes output light.

The opening may be provided on one side or both sides of the optical waveguide interconnection board. The mounting of the electric device or the optical device is also not limited to one side.

The photoelectric multifunction board of the invention may be structured such that optical signals from an optical device can be output from a side opposite to the side on which the optical device is mounted, or such that an optical device can be coupled to another optical device mounted on the opposite side through optical signals. The mounting precision of the optical device is preferably at most 5 μm from the viewpoint of efficiency of optical connection.

Referring to FIGS. 13A to 13D, the photoelectric multifunction board of the invention and a method of manufacturing the same will be described below. An opening 340 for optical connection (an optical input/output port) is formed in the optical waveguide interconnection board 300 which has the light direction-changing elements and the optical waveguide formed by the processes as shown in FIGS. 9A to 12C (see FIG. 13A). In this embodiment, the opening is formed on one side of the optical waveguide interconnection board. For example, the opening can easily be formed by a process in which an etching mask is prepared by a photolithographic process and in which oxygen plasma etching is conducted. However, any other process may be used. Alternatively, an electric circuit board such as a printed circuit board may be laminated on the optical waveguide interconnection board without preparation of such an etching mask, and then etching may be performed through the optical input/output port of the printed circuit board.

Figure 13A:
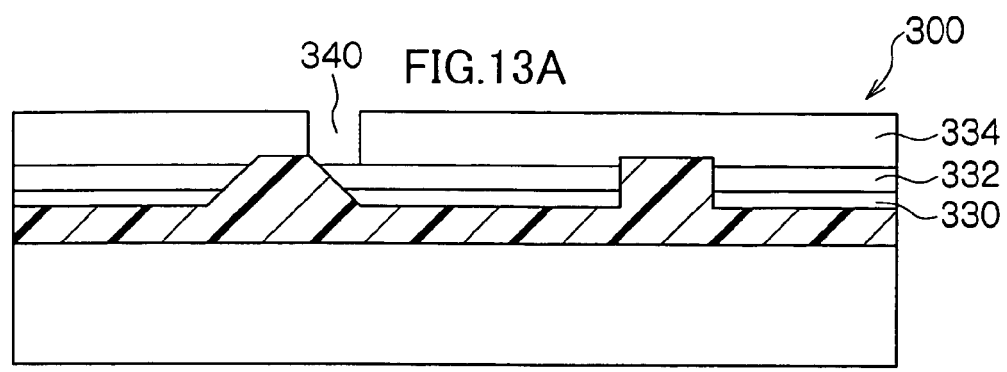
FIGS. 13A to 13D are diagrams showing a process of preparing a photoelectric multifunction board including an optical waveguide interconnection board.
Figure 13B:
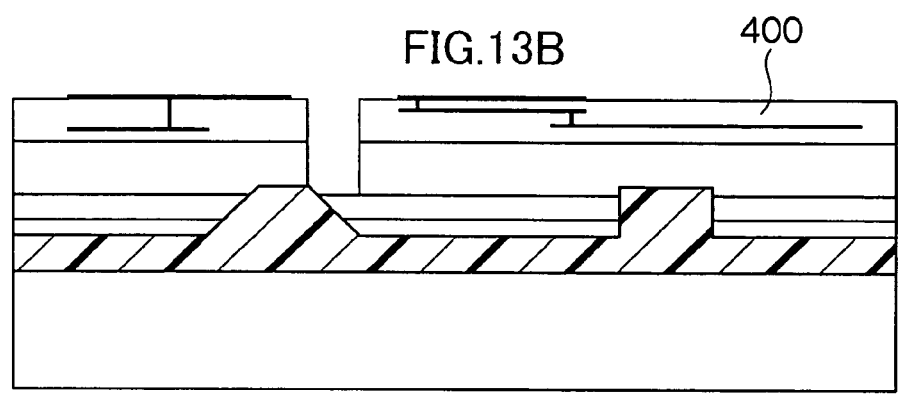

As shown in FIG. 13B, a printed circuit board 400 is laminated on the optical waveguide interconnection board having the opening 340 for optical connection. Any bonding method may be used so as to bond the optical waveguide interconnection board and the printed circuit board. Alternatively, the printed circuit board may be formed on the optical waveguide interconnection board by a build-up method.

Figure 13C:
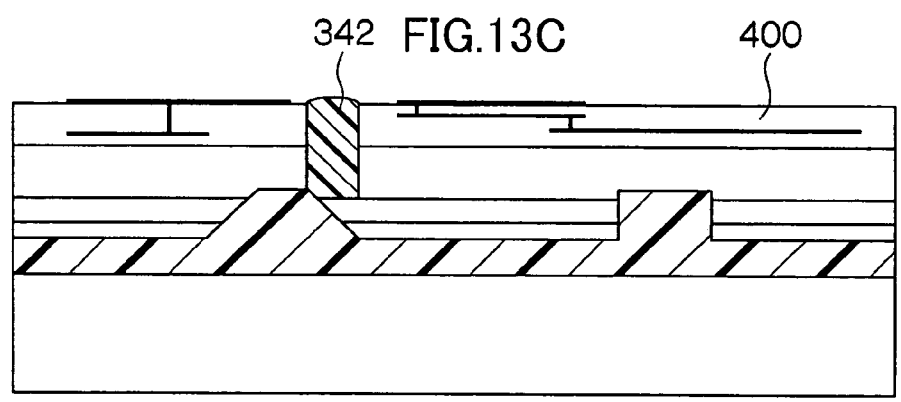

The opening may be used as it is. As shown in FIG. 13C, however, the openings of the optical waveguide interconnection board and the printed circuit board may be filled with a material (a waveguide material) 342 having a refractive index substantially equal to that of the core, so that connection efficiency can be improved. Alternatively, an optical pin may be inserted into these openings in place of the filling material.

Figure 13D:
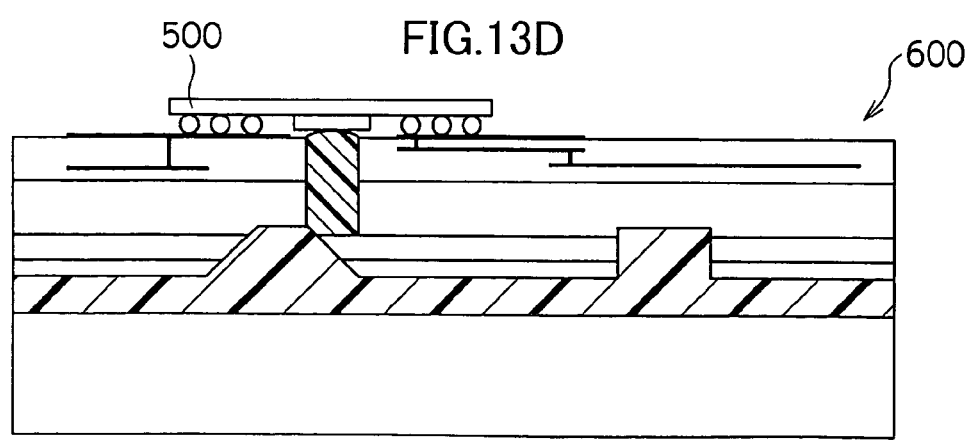

As shown in FIG. 13D, an MCM module 500 is soldered onto the printed circuit board 400 to form a photoelectric multifunction board 600. An SMT device may be mounted on the printed circuit board 400 in place of the MCM module.

Precursor for Use in Manufacturing Optical Waveguide Interconnection Board

According to the invention, the precursor for use in manufacturing an optical waveguide interconnection board has: at least one element of at least one light direction-changing element A that changes the direction of light in a plane parallel to the plane of the optical waveguide interconnection board and at least one light direction-changing element B that changes the direction of light to a direction having an angle with respect to a plane parallel to the plane of the optical waveguide interconnection board; and a lower clad for an optical waveguide. In a preferred mode, the height of the light direction-changing element A and/or B and the thickness of the lower clad are such that, when a core and an upper clad are formed in a subsequent process, the top(s) of the light direction-changing element(s) A and/or B can reach the boundary between the core and the upper clad, or the inside of the upper clad.

The optical waveguide interconnection board of the invention is prepared by forming a core and an upper clad on the lower clad of this precursor.

EXAMPLES

The invention will be more specifically described with reference to the following examples, which are not intended to limit the scope of the invention.

Example 1

A $Si_3N_4$ film and a polysilicon film are deposited in that order on a Si substrate having a thickness of 650 μm by a plasma CVD method in order to form a protective film. A positive photoresist is applied to the protective film, exposed to light and developed. A rectangle portion having a size of 400×200 μm is removed from the resultant resist layer to form an opening. Here, the opening is formed such that it has one side perpendicular to a line connecting first and second pits which will be formed later and such that the four corners thereof are rounded. A portion of the protective film which portion has a surface shape corresponding to the shape of the opening is removed from the protective film by reactive ion etching. The resist layer is then removed with a mixed liquid of hot sulfuric acid and hydrogen peroxide. Thereafter, the Si substrate is etched with an anisotropic etching liquid including a mixed liquid of ethylenediamine and pyrocatechol until the depth of the resultant pit reaches 100 μm. The resulting pit has a slant face inclined with respect to the bottom surface of the Si substrate by about 45°. The protective film is then removed with hot phosphoric acid. Thus, the first pit corresponding to a light direction-changing element B (which first pit has a cross-sectional shape shown in FIG. 9F) is obtained.

A positive photoresist is applied to the Si substrate having the first pit, exposed to light and developed. A square portion having a size of 100 μm×100 μm is removed from the resist layer to form an opening, and an etching mask is thus formed. Here, the square opening is formed such that one side thereof has an angle of 45° with respect to the line (in the direction of light transmission) connecting the first pit and the second pit which will be formed later by etching. The Si substrate is etched through the etching mask by reactive ion etching until the depth of the resultant pit reaches 100 μm. Thus, the second pit corresponding to a light direction-changing element A is obtained. The resist layer is then removed with a mixed liquid of hot sulfuric acid and hydrogen peroxide. The resultant product is used as a mold in the following process.

The mold is used as a master. A polyimide plate (Upirex manufactured by Ube Industries, Ltd) is heated to about 280° C. and the softened polyimide plate is pressed against the mold to transfer the shapes of the first and second pits, and light direction-changing elements A and B are thus formed. A 1 μm thick Au film is deposited on the polyimide plate by a vacuum deposition method to form a light-reflecting film. Thus, a resin substrate having the light direction-changing elements A and B is obtained.

Glasia for clad, manufactured by Nippon Paint Co., Ltd., is applied to the resin substrate having the light direction-changing elements to form a lower clad. Next, a core is formed on the lower clad. The pattern of the core is such that light goes between the light direction-changing elements A and B, that the light direction-changing element A changes the direction of the light by 90°, and that the light is output from an end portion of the optical waveguide interconnection board. The core is made by exposing Glasia for core, manufactured by Nippon Paint Co., Ltd., to light in a specific pattern. In this embodiment, an unexposed portion forms the core. Glasia for clad manufactured by Nippon Paint Co., Ltd. is applied to the core to form an upper clad. The core has a thickness of 50 μm, and the light direction-changing element A and B are formed so that they protrude from the top of the core.

A positive resist is applied to the upper clad, exposed to light and developed to form an etching mask, and then the upper clad is etched to form an opening (an optical connection port). The position of the opening is such that incident light from the opening is reflected by the light-reflecting surface of the light direction-changing element B and transmitted through the core (see FIG. 13A). A printed circuit board having an opening at the same position is laminated on the optical waveguide interconnection board having the opening (see FIG. 13B), and the openings are filled with an organopolysilane material.

A solder material is in advance printed on the printed circuit board, and an optical MCM is mounted with a high precision mounter and connected to the printed solder through a reflow soldering process. As a result of these processes, a photoelectric multifunction board is obtained.

A light beam is input from an optical output port of the optical MCM to the optical waveguide interconnection board. The direction of the light beam is changed by the light direction-changing element B and the light beam is transmitted through the core. The light direction-changing element A changes the direction of the light beam by 90°, and the light beam is output from the end portion of the optical waveguide interconnection board.

What is claimed is:

1. An optical waveguide interconnection board, comprising:
   an optical input port;
   an optical output port;
   at least one optical waveguide which corresponds to an optical circuit pattern; and
   at least one light direction-changing element each of which is disposed between one of the optical input port and the optical output port and one of the at least one optical waveguide or, when the optical waveguide interconnection board has two or more optical waveguides, between two of the optical waveguides, and which comprises at least one light direction-changing element B that changes the direction of light to a direction having an angle with respect to a plane parallel to the plane of the optical waveguide interconnection board.

2. The optical waveguide interconnection board of claim 1, wherein the at least one light direction-changing element has a reflecting surface that reflects light so as to change the direction of the light.

3. The optical waveguide interconnection board of claim 2, wherein the reflecting surface is a concave surface.

4. The optical waveguide interconnection board of claim 3, wherein the concave surface is made of a material having optical properties equal or close to those of a clad portion.

5. The optical waveguide interconnection board of claim 2, wherein the reflecting surface has a light-reflecting film.

6. The optical waveguide interconnection board of claim 1, wherein the at least one light direction-changing element further comprises at least one light direction-changing element A that changes the direction of light in a plane parallel to a plane of the optical waveguide interconnection board.

7. A method of manufacturing the optical waveguide interconnection board of claim 6, comprising:
   forming on a substrate at least one light direction-changing element A for changing the direction of light in a plane parallel to a plane of the optical waveguide interconnection board and at least one light direction-changing element B for changing the direction of light to a direction having an angle with respect to a plane parallel to the plane of the optical waveguide interconnection board; and
   forming at least one optical waveguide corresponding to an optical circuit pattern on the substrate having the at least one light direction-changing element A and the at least one light direction-changing element B.

8. A method of manufacturing the optical waveguide interconnection board of claim 6, comprising:
   providing a mold having a mold substrate and, on the mold substrate, at lest one first pit corresponding to a light direction-changing element A for changing the direction of light in a plane parallel to a plane of the optical waveguide interconnection board and at least one second pit corresponding to a light direction-changing element B for chanign the direction of light to a direction having an angle with respect to a plane parallel to the plane of the optical waveguide interconnection board;
   filling the at least one first pit and the at lest one second pit of the mold with a resin and transferring the shapes of the at least one first pit and the at least one second pit to the resin to form a resin substrate having at least one light direction-changing element A and at least one light direction-changing element B; and
   forming at least one optical waveguide corresponding to an optical circuit pattern on the resin substrate.

9. The optical waveguide interconnection board of claim 1, wherein each of the optical input port and the optical output port is not one end of one of the at least one optical waveguide.

10. The optical waveguide interconnection board of claim 9, wherein the optical input port and the optical output port are filled with a waveguide material.

11. The optical waveguide interconnection board of claim 1, comprising optical waveguides which correspond to the optical circuit pattern, wherein the longitudinal direction or directions of at least one of the optical waveguides are parallel to the plane of the optical waveguide interconnection board and the longitudinal direction or directions of the other are not parallel to the plane and the optical waveguides intersect with each other.

12. A method of manufacturing the optical waveguide interconnection board of claim 1, comprising:
   forming on a substrate at least one light direction-changing element B for changing the direction of light to a direction having an angle with respect to a plane parallel to the plane of the optical waveguide interconnection board; and
   forming at least one optical waveguide corresponding to an optical circuit pattern on the substrate having the at least one light direction-changing element B.

13. A method of manufacturing the optical waveguide interconnection board of claim 1, comprising:
   providing a mold having a mold substrate and, on the mold substrate, at least one pit corresponding to a light direction-changing element B for changing the direction of light to a direction having an angle with respect to a plane parallel to the plane of the optical waveguide interconnection board;
   filling the at least one pit of the mold with a resin and transferring the shape or shapes of the at least one pit to the resin to form a resin substrate having at least one light-direction-changing element B; and
   forming at least one optical waveguide corresponding to an optical circuit pattern on the resin substrate.

14. The optical waveguide interconnection board of claim 1, wherein the at least one light direction-changing element is at least one light direction-changing element A that changes the direction of light in the plane parallel to the plane of the optical waveguide interconnection board and at least one light direction-changing element B that changes the direction of light to the direction having an angle with respect to the plane parallel to the plane of the optical waveguide interconnection board.

15. The optical waveguide interconnection board of claim 1, wherein the at least one light direction-changing element not only changes the direction of light but also divides the light.

16. The optical waveguide interconnection board of claim 1, comprising optical waveguides which correspond to the optical circuit pattern, wherein the longitudinal directions of the optical waveguides are parallel to the plane of the optical waveguide interconnection board and the optical waveguides intersect with each other.

17. A precursor for use in manufacturing an optical waveguide interconnection board, comprising at least one light direction-changing element and a lower clad for an optical waveguide, wherein the at least one light direction-changing element comprises at least one light direction-changing element B that will change the direction of light to a direction having an angle with respect to a plane parallel to the plane of the optical waveguide interconnection board.

18. A photoelectric multifunction board, comprising: a laminate of the optical waveguide interconnection board of claim 1 and an electric circuit board; and one of an optical device and a combination of an optical device and an electric device, which is mounted on the electric circuit board.

19. The photoelectric multifunction board of claim 18, wherein the at lest one light direction-changing element further comprises at least one light direction-changing element A that changes the direction of light in a plane parallel to a plane of the optical waveguide interconnection board.

20. A method of manufacturing the photoelectric multifunction board of claim 19, comprising: laminating the optical waveguide interconnection board and an electric circuit board; mounting one of an optical device and a combination of an optical device and an electric device; and simultaneously soldering the one of the optical device and the combination of the optical device and the electric device.

21. The photoelectric multifunction board of claim 18, wherein optical signals are input from or output to the optical device via the light direction-changing element B that is provided in the optical waveguide interconnection board to change the direction of light to a direction having an angle with respect to a plane parallel to the plane of the board.

22. The photoelectric multifunction board of claim 18, wherein optical signals from the optical device are output from a side opposite to the side on which the optical device is mounted, or the optical device can be coupled to another optical device mounted on the opposite side through optical signals.

23. A method of manufacturing the photoelectric multifunction board of claim 18, comprising: laminating the optical waveguide interconnection board and an electric circuit board; mounting one of an optical device and a combination of an optical device and an electric device; and simultaneously soldering the one of the optical device and the combination of the optical device and the electric device.

24. A photoelectric multifunction board comprising a laminate of the optical waveguide interconnection board of claim 1 and an electric circuit board.

25. The photoelectric multifunction board of claim 24, wherein each of the optical input port and the optical output port of the optical waveguide interconnection board is not one end of one of the at least one optical waveguide, and the electric circuit board has an optical input opening and an optical output opening, and the optical input and output ports and the optical input and output openings are filled with an optical waveguide material.

26. The precursor of claim 17, wherein the at least one light direction-changing element further comprises at least one light direction-changing element A that will change the direction of light in a plane parallel to a plane of the optical waveguide interconnection board.

* * * * *